3,297,785
MELAMINE-ALDEHYDE RESIN MODIFIED
POLYESTER REACTION PRODUCTS
Norman J. George and Alexander Kitun, St. Louis, Mo.,
assignors to P. D. George Company, St. Louis, Mo., a
corporation of Delaware
No Drawing. Filed Sept. 30, 1963, Ser. No. 312,320
22 Claims. (Cl. 260—850)

This invention relates to polyester resins and electrical conductors coated therewith. More particularly this invention relates to the polyester resins derived from polyfunctional derivatives of isocyanuric acid which contain a plurality of —alkyl— X groups where X is $$-OH \text{ or } -\overset{O}{\underset{\|}{C}}OR$$

and where R is H or an alcohol moiety; for example tris(2-hydroxyethyl) isocyanurate and tris(2-carboxyethyl) isocyanurate and esters thereof; and to electrical conductors coated therewith.

Synthetic resins suitable for use as electrical insulating materials, particularly materials which are satisfactory for use as slot insulation in dynamoelectric machines and for use as insulation for conductors which are to be employed as magnet wires (insulated electrical conductors) in electrical apparatus must be able to withstand extremes of mechanical, chemical, electrical and thermal stresses. Thus, wires to be employed as coil windings in electrical apparatus are generally assembled on automatic or semi-automatic coil winding machines which, by their very nature, bend, twist, stretch and compress the enameled wire in their operation. After the coils are wound, it is common practice to coat them with a varnish solution containing solvents such as ketones, alcohols, aliphatic and aromatic hydrocarbons, halogenated carbon compounds, etc. Magnet wire insulation must be resistant to these solvents. In order to conserve space in electrical apparatus, it is essential that the individual turns which make up the coils be maintained in close proximity to each other. Because of the closeness of the turns and the fact there may be a large potential gradient between adjacent turns, it is necessary that the resins employed as wire enamels have a high dielectric strength to prevent short circuiting between adjacent coated wires. In operation of electrical apparatus containing coiled wires, high temperatures are often encountered and the enamels must be able to withstand these high temperatures as well as the mechanical stresses and vibrations encountered in electrical apparatus so that the enamel coating does not soften, crack, or come off the wire.

We have now discovered economical polyester resins having improved mechanical, chemical, electrical and thermal properties which are adaptable for use as insulation for electrical conductors, such as for use as magnet wire insulation, as slot insulation in electrical apparatus, etc.

In accordance with this invention we have prepared polyester resins derived from polyfunctional derivatives of isocyanuric acid which contain a plurality of —alkyl— X groups where the alkyl group is straight chained or branched and where the alkyl has for example 1–10 or more carbons such as 2–4 carbons, but preferably 2 carbons, where X is

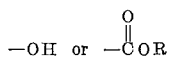

and R is hydrogen or an alkyl moiety, for example alkyl, aryl, cycloalkyl, etc.; for example compounds of the formula:

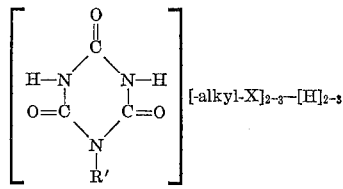

where R' is hydrogen or a substituted group, such as a hydrocarbon group, for example alkyl, aryl, cycloalkyl, etc., e.g. methyl, ethyl, propyl, butyl, etc., phenyl, cyclohexyl, etc., but preferably compounds of the formula

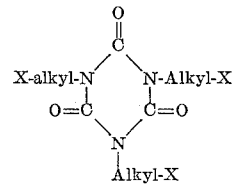

(hereinafter referred to generically as "isocyanuric derivatives").

These isocyanuric derivatives are conveniently prepared as follows:

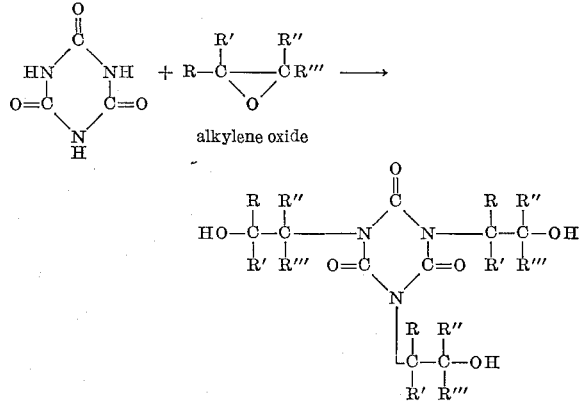

where the R's are preferably hydrogen or an alkyl group, for example where the alkylene oxide is ethylene, propylene, butylene, octylene, etc. oxides.

The carboxylated derivatives are conveniently prepared by reacting isocyanuric acid with an unsaturated nitrile or an unsaturated ester, for example

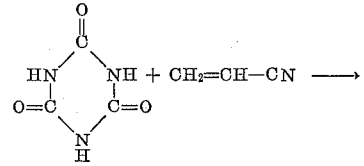

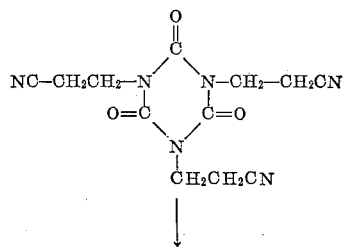

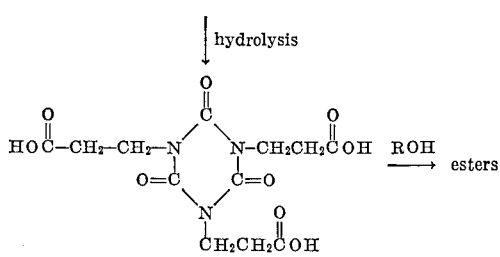

hydrolysis by reacting the sodium salt of isocyanuric acid with chloroacetic esters, etc.

We have prepared polyesters from (1) polycarboxylic acids, esters, etc., (2) glycols and (3) polyols, wherein (1), (2) or (3) are replaced in whole or in part by isocyanuric derivatives.

Furthermore, we have prepared essentially linear polyester resins containing the isocyanuric derivatives which are cross-linked with conventional cross-linking agents, such as for example polyisocyanates including the blocked isocyanates of the Mondur type (Mobay Chem. Co.); for example an essentially linear polyester prepared from a dicarboxylic acid, a glycol and a compound of the formula

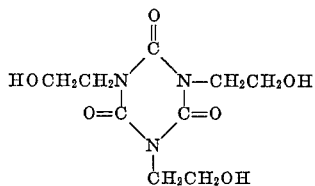

has been modified with a cross-linking agent such as polyisocyanate.

We have also prepared polyesters containing isocyanuric derivatives prepared with fatty acids and/or oils, for example of long, medium and short oil content.

Thus, our invention includes but is not limited to the following:

(1) Essentially linear polyester resins which contain an isocyanuric derivative.

(2) The cured product of (1).

(3) Essentially linear polyester resins containing an isocyanuric derivative which are modified with conventional curing or modifying agents with or without metal catalysts.

(4) Polyesters containing isocyanuric derivatives prepared with oils.

Our invention includes the use of these polyesters in surface coatings, laminates, films, electrical insulators, especially as wire enamels, such as electrical insulators for insulating magnet wire, as slot insulation in dynamoelectric machines; and the use of these compositions which have been "overcoated" with suitable materials such as varnish, resins, and polymers such as those of the following types: Dacron, Mylar, nylon, Kodel, Vicron, Dupont's M-L, etc.; and to their use as wire enamels.

In the preferred embodiment we have discovered that polyester resins prepared from (1) polycarboxylic acids or esters (2) glycols and (3) tris(hydroxyethyl) isocyanurate possess excellent properties. We have further discovered that when said resins are prepared by a certain procedure excellent properties are improved. Thus, we have discovered when a polycarboxylic acid is first esterified with tris(hydroxyethyl) isocyanurate prior to esterifying this product with the glycol (a two-step process) an excellent product is obtained. We have further discovered that when this two-step process is further modified by employing a phenolic product therein, such as cresylic acid, during esterification, a further improved product is obtained.

Specifically, we have discovered polyester resins prepared from (1) a phthalic acid or esters, preferably orthophthalic or terephthalic esters, (2) ethylene glycol and (3) tris(hydroxyethyl) isocyanuratae possesses excellent properties. This process may be modified by employing cresylic acid during esterification. We have also discovered that when these polyesters are prepared by transesterifying a phthalic ester with tris(hydroxyethyl) isocyanurate prior to esterifying the product thereof with ethylene glycol, a superior product is obtained. We have further discovered that when this two-step cook process is modified by employing cresylic acid during esterification, a further improved product is obtained.

These polyesters when cured on an electrical conductor produce excellent insulation.

Provided the final product contains an isocyanurate derivative, a wide variety of polycarboxylic acids, glycols, and polyols can be employed.

A wide variety of polycarboxylic acid or esters thereof can be employed in the preparation of the polyesters of this invention. In general these include the polycarboxylic acids conventionally employed in the preparation of polyesters. These acids may possess two, three, four or more carboxyl groups, may be aliphatic, alicyclic, heterocyclic, aromatic, etc. and may be saturated or unsaturated. Examples of such acids include the alkanedicarboxylic acid, for example those of the formula $$HOOC-(CH_2)_n COOH$$

where $n=1-10$ or more such as malonic, succinic, glutaric, adipic, pimelic, suberic, azelaic, sebacic, etc. acids, isomers thereof where the alkylene group is branched and/or one or more of the carboxyl groups is not terminal; substituted alkanedicarboxylic acids such as chlorosuccinic, etc.; alicyclic dicarboxylic acids, such as cyclohexanedicarboxylic acid, etc.; aromatic acids such as phthalic, isophthalic, terephthalic, diphenic, hemimellitic, trimellitic, 1,8-naphthalenic acid, dichlorophthalic acids; unsaturated acids such as fumaric, maleic, muconic, citraconic, mesaconic, glutaconic, (cis and trans), aconitic (cis and trans), bromomaleic, etc.; hydroxyacids such as citric, malic, tartaric, etc. acids; dimeric fatty acids such as dilinoleic acid, etc.; adducts of maleic acids with various unsaturated and/or conjugated hydrocarbons such as diisobutylene, butadiene, rosin, abietic acid, terpolene, cyclopentadiene, linoleic acid, etc.; diglycollic acid, ethylenebisdiglycollic acid, etc.

The preferred polycarboxylic acids are the dicarboxylic acids containing from 2 to 10 carbon atoms, such as succinic, glutaric, adipic, suberic, maleic, phthalic, isophthalic, terephthalic, and the like. Particularly preferred polycarboxylic acids are the aromatic dicarboxylic acids, containing from 6 to 10 carbon atoms wherein the two carboxyl groups are attached directly to the aromatic nucleus such as the phthalic acids, but most preferably isophthalic and terephthalic acids.

In some cases it may be desirable to utilize other forms of the acids, such as the acid anhydrides or acid chlorides, such as phthalic anhydride, maleic anhydride, succinic chloride, and the like.

The esters of the polybasic acids may be utilized where the polyesters are to be produced by an ester-exchange reaction. Preferred derivatives to be used for this purpose comprise the esters of the above-described acids and the lower saturated monohydric alcohols, preferably those containing from 1 to 5 carbon atoms, such as methyl alcohol, ethyl alcohol, propyl alcohol, butyl alcohol and amyl alcohol.

The glycol employed in preparing polyesters can vary widely. In general, they are the glycols conventionally employed in preparing polyesters. Suitable examples include the following: alkylene glycols of the formula $H(OA)_n OH$ where $n$ is for example 1-10 or higher and A is alkylene; ethylene, propylene, butylene, etc., for example ethylene glycol, diethylene glycol, propylene glycol, dipropylene glycol, tripropylene glycol, triethylene glycol, butylene glycol, tetramethylene glycol, neopentyl glycol, 2-methyl-1,3-pentanediol, 1,5-pentanediol, hexamethylene glycol, xylylene glycol etc. Preferably, one employs an alkanediol of the general formula $HO(CH_2)_nOH$ where $n=2-5$ or isomers thereof wherein the alkane group is branched and/or the hydroxy groups are not terminal. The preferred glycol is ethylene glycol.

The polyols (apart from the isocyanuric derivatives) used in the preparation of the polyesters of this invention can be widely varied and are those containing at least three esterifiable hydroxyl groups. In general, these are the polyhydric alcohol conventionally employed in preparing polyesters. Illustrative examples of such alcohols are glycerol, polyglycerol, pentaerythritol, mannitol, trimethylolethane, trimethylolpropane, 1,2,6-hexanetriol, polypentaerythritol, polyallyl alcohol, polymethallyl alcohol, polyols formed by the condensation of bisphenols with epichlorohydrin, and the like.

Preferred polyhydric alcohols to be used in the preparation of these polyesters are the aliphatic alcohols possessing from 3 to 6 hydroxyl groups and containing from 3 to 14 carbon atoms, such as glycerol, pentaerythritol, mannitol, 1,4,6-octanetriol, 1,3,5-hexanetriol and 1,5,10-dodecanetriol.

In the most preferred embodiment of this invention the above polyols are omitted and the tris(hydroxyalkyl) isocyanurate is employed.

It should be understood that mixtures of more than one polycarboxylic acid, more than one glycol and more than one polyol can be employed.

The ratio of (1) polycarboxylic acids to (2) glycols to (3) polyols can vary widely depending on many variables such as the specific compounds employed, the intended use, the modifying agents, etc.

For example, the polyester can comprise the product of (1) from about 20 to 60 equivalent percent, such as from about 25 to 55% but preferably from about 35 to 50% of a polycarboxylic acid; (2) from about 10 to 50 equivalent percent, such as from about 15 to 45% but preferably from about 25 to 40% of a glycol; and (3) from about 10 to 60 equivalent percent, such as from about 15 to 50%, but preferably from about 20 to 35% of a polyol (including tris(hydroxyethyl) isocyanurate). The sum of (1), (2) and (3) above equals 100 equivalent percent.

In the preferred specific polyester of the present invention where a phthalic acid, ethylene glycol and tris(hydroxyethyl) isocyanurate are reacted, the ratio employed to achieve an excellent product is as follows:

(1) The phthalic acid of from about 40 to 50, for example from about 42 to 48, but preferably about 43 to 45 equivalent percent.

(2) Ethylene glycol from about 23 to 33, for example from about 25 to 30, but preferably from about 26 to 28 equivalent percent.

(3) Tris(hydroxyethyl) isocyanurate from about 25 to 35, for example from about 27 to 33, but preferably from about 28 to 31 equivalent percent.

If desired the following compositions may be utilized in modifying the polyesters of this invention:

(1) Monocarboxylic acids, either saturated or unsaturated.

(2) Fatty acids and glyceryl esters, also known as drying oils

Long oil (for example about 64–70% oil)
Medium oil (for example about 53–61% oil)
Short oil (for example about 42–50%)

(3) Natural resins for example rosin, copals and ester gums, etc.

(4) Urea-aldehyde; triazine resins, melamine-aldehyde resins; melamine-formaldehyde resins modified with an alcohol, methanol, ethanol, propanol, butanol, ets.

(5) Phenol-aldehyde resins, novolak resins, etc. such as aniline-aldehyde resins, etc.

(6) Terpenes (for example the Petrex type resins), etc.
(7) Diels-Alder addition products, for example

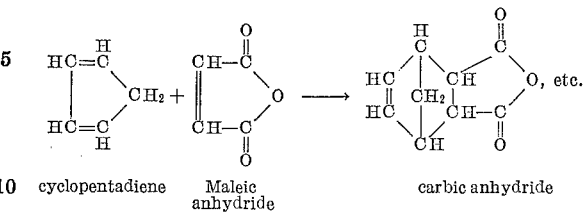

cyclopentadiene   Maleic anhydride   carbic anhydride etc.

(8) Unsaturated alcohols, for example allyl alcoholglycol maleates, etc.

(9) Vinyl copolymers, for example reacted with maleic anhydride, such as styrene, vinyl chloride, vinylidene chloride, vinyl acetate, the acrylates and methacrylates, polyolefins, such as polyethylene, polypropylene, etc.

(10) Epoxide resins such as the reaction product of epichlorohydrin and bisphenol-A, etc.

(11) Silicone resins, etc.
(12) Cellulose acetate resins, etc.
(13) Polyamide resins such as the nylon type resins, etc.
(14) Buton resins (styrene-butadiene co-polymers modified with maleic, etc.).
(15) Polyamines such as phenylene diamine, methylenedianiline, etc.
(16) Other modifying agents employed in the polyester art.

The polyester resins of the present invention may be prepared in fairly conventional ways. Thus, the lower dialkyl ester of terephthalic acid and isophthalic acid, the glycol and the polyhydric alcohol and/or the isocyanuric derivatives are merely added to any suitable reaction vessel and reacted by a one-step total fusion, a two-step process or other processes hereinafter described. This reaction vessel may be formed of any suitable material such as glass, stainless steel or any of the other metals commonly employed in processing polyester resins. Since the reaction involved in forming the polyester resins of the present invention is essentially an alcoholysis reaction, the net effect of the reaction is to substitute a polyhydric alcohol or a glycol for the lower alkyl radical of the lower dialkyl isophthalates or terephthalates with the concurrent liberation of the lower alcohol. In the case of the dimethyl esters of the acids the alcohol which is liberated is methanol. Therefore, suitable means should be provided for eliminating the methanol or other lower alcohols liberated during the reaction period. In general, heat is applied to the reaction mixture and the lower alcohol liberated is either vented to the atmosphere or collected in a condenser system. Since the lower dialkyl esters of terephthalic acid have a tendency to sublime when heated too rapidly, it is desirable to provide means for condensing this sublimate while still allowing the lower alcohols to escape from the system. This may be accomplished by operating a condenser over the reaction vessel at a temperature suitable to condense the sublimate while allowing the lower alcohol vapors to escape.

Since alcoholysis reactions are rather slow when run without catalysts, we prefer to use alcoholysis catalysts when preparing the polyester resins of the present invention. Among the many alcoholysis catalysts which may be used are included for example, lead oxides, lead acetate, zinc oxide, cadmium acetate, cuprous acetate, zinc acetate, magnesium acetate, beryllium acetate, stannic acetate, ferric acetate, nickel acetate, etc. The amount of catalyst employed is not critical and may vary over a wide range depending on the particular polyester system under consideration. In general, we employ from about 0.01 to about 5 percent, by weight, of the alcoholysis catalyst, based on the total weight of polyester resin. Higher concentrations of such catalyst may be employed but no advantage is gained by such use. Preferably, we employ about 0.1 percent, by weight, of the metallic component of catalyst based on the total weight of the resin employed.

In preparing the polyester resins of the present invention we have found it desirable to heat the reactants to obtain as high a molecular weight material as possible without causing gelation of the resulting product. The reaction is accomplished by heating the reactants from room temperature to a temperature of about 390° to 500° F. but preferably 400–450° F. over a period of from two to ten or more hours. During the initial heating period it is sometimes found that sublimation of the lower dialkyl esters of the acids employed begins to occur. To prevent this sublimation, xylene or some similar material may be added to the reaction mixture to keep the lower dialkyl ester of the acid in solution. The xylene or other similar material takes no part in the reaction and is distilled from the reaction mixture during the course of the reaction. Any water which is present in the raw materials employed in the reaction is also distilled from the reaction mixture during the heating process. One source of moisture commonly found in the reaction mixture is the water which may be dissolved in the polyol.

The alcoholysis catalyst may be added to the reaction mixture at the beginning of the heating period or after the reactants have been heated for a short length of time to remove any water present in the raw materials employed. After heating the reactants to the desired final temperature between about 390 and 500° F. but preferably 400–450° F. the reaction may be stopped or the product may be maintained at the final temperature for another 2 to 4 hours to increase the molecular weight. When the product is maintained at this final temperature it is necessary to stop the reaction before the resin reaches such a high molecular weight that gelation occurs.

The reaction is generally terminated by pouring a suitable solvent into the hot polyester resin to form a solution having a solids content of about 25 to 50 percent, by weight. This solution is then filtered to remove any insoluble matter. Among the many solvents suitable for the polyester resins employed in the present invention may be mentioned cresylic acid, m-cresol, xylenols, polyhydroxy benzenes, xylene and other polyalkyl benzenes, high boiling petroleum hydrocarbons, such as Solvesso 100, Solvesso 150, the M.L. solvents such as dimethyl formamide, dimethyl acetamide, the vinyl pyrrolidones, etc.

Instead of dissolving the polyester resins of the present invention in a solvent, it is sometimes desirable to use the resinous materials without a solvent being present. For these applications the resin is merely allowed to cool down to room temperature without the addition of any type of solvent. This results in a brittle solid mass which may be ground into a powder if desired for further use. Where the resin has been obtained in powder form and it is subsequently desired to use it in solution, the resin may be added to a suitable solvent and the mixture heated up to a temperature of about 212° F. until complete solution of the resin takes place.

The term "equivalent" as used in the present application refers to the number of moles of a substance multiplied by the number of functional groups present in its structure. Thus, the number of equivalents of dimethyl terephthalate in a quantity of dimethyl terephthalate is the number of moles of dimethyl terephthalate present times two. The number of equivalents of glycerin or tris(hydroxyethyl) isocyanurate present in a given quantity of glycerin or tris(hydroxyethyl) isocyanurate is the number of moles of glycerin or tris(hydroxyethyl) isocyanurate present in that quantity times three. The term "equivalent percent" as used in the present application refers to the number of equivalents of a particular reactant divided by the total number of equivalents of all reactants times one hundred. The compositions employed in the present invention are described in terms of equivalents instead of in terms of moles, since the ingredients which make up the polyester resins react equivalent for equivalent rather than mole for mole.

The polyesters presented in the following table were prepared by one of two general procedures and modifications thereof:

I. One-Step Fusion Process where the dicarboxylic acid, glycol, and tris(hydroxyethyl) isocyanurate are simultaneously esterified to the desired viscosity. I–A is a modified process where esterification is carried out in the presence of cresylic acid.

II. A Two-Step Process where the dicarboxylic acid and tris(hydroxyethyl) isocyanurate are first esterified to the desired viscosity, the glycol added thereto dropwise, and esterification continued to the desired viscosity. II–A is a modified process where cresylic acid is added to the product of the two-step process and esterification continued in the presence of cresylic acid until the desired viscosity is reached.

Each of these processes is illustrated by the following examples which are presented for purposes of illustration and not of limitation.

EXAMPLE 15.—ONE-STEP FUSION PROCESS (PROCESS I)

A polyester resin was prepared from the following ingredients:

| | Equivalent percent |
|---|---|
| Dimethylphthalate (DMT) | 43.45 |
| Ethylene glycol (EG) | 27.55 |
| Tris(hydroxyethyl) isocyanurate (THIC) | 29.0 |

The ingredients were added to a 5 liter, 3 necked flask fitted with a thermometer, stirrer, distillate column, a Dean and Stark trap, and an additional funnel. A carbon dioxide blanket was maintained on the system. The system was heated to fusion and when the temperature reached about 300° F. an esterification catalyst (PbO) was added, 0.1% based on total charge. Heating was continued for a period of about six hours as alcohol was distilled off under transesterification during which period the temperature rose to about 430° F. A viscosity of Q (31%) was obtained.

EXAMPLE 19 (PROCESS I–A)

| | Equivalent percent |
|---|---|
| DMT | 44.3 |
| EG | 28.0 |
| THIC | 27.7 |

A polyester resin was prepared as in Example 15 until a viscosity of X (37%) was reached.

Thereupon cresylic acid was added to yield a solution having 70% solids. Esterification was continued at 430° F. until a viscosity of Z (34%) was reached.

EXAMPLE 23.—TWO-STEP PROCESS (PROCESS II)

A polyester resin was prepared from the following ingredients:

| | Equivalent percent |
|---|---|
| DMT | 43.35 |
| THIC | 29.10 |
| EG | 27.55 |

DMT and THIC were added to a 5 liter, 3 necked flask fitted with a thermometer, stirrer, distillate column, a Dean and Stark trap and an addition funnel. A carbon dioxide blanket was maintained on the system. DMT and THIC were heated to fusion and when the temperature reached about 300° F. an esterification catalyst was added (Pbo), 0.1% based on total charge. Heating was continued for a period of about 8 hours as alcohol was distilled off during transesterification. During this period the temperature rose to about 400° F. and a viscosity of T–U (37%) was obtained. Thereupon EG was added drop-wise to this reaction product over a period of about one hour and esterification was continued until the product had a viscosity of O (31%).

EXAMPLE 26.—MODIFIED TWO-STEP PROCESS (PROCESS IIA)

A polyester resin was prepared from the following ingredients:

|  | Equivalent percent |
|---|---|
| DMT | 42.0 |
| THIC | 31.4 |
| EG | 26.6 |

The procedure presented in Example 23 was followed until a viscosity of X–Y was reached (37%).

Thereupon cresylic acid was added to yield a solution having 70% solids. Esterification was continued at 425° F. until a viscosity of R (34%) was reached.

Since the following examples were similarly prepared, they are presented in tabular form with the more relevant details being presented in Table I where (1) DMT means dimethyl terephthalate
(2) EG means ethylene glycol
(3) THIC means tris(2-hydroxyethyl) isocyanurate
(4) TICA means tris(2-carboxyethyl) isocyanurate
(5) TICME means the methyl ester of (4)
(6) The Gardner-Holdt viscosities as presented in Table I are (a) in 37% cresylic acid (CA) in the Process column and (b) in 60:40 weight ratio of cresylic acid to aromatic solvent (20 parts Solvesso 100 and 20 parts Solvesso 150) in the weight percents indicated in the Final Viscosity column.

TABLE I

| Ex. | Ingredients | Equivalent percent | Max. temp., °F. | Total reaction time, hours | Process | Gardner-Holdt final viscosity |
|---|---|---|---|---|---|---|
| 1 | DMT<br>EG<br>THIC | 45.8<br>29.0<br>25.2 | 480 | 3½ | I | R.[1] |
| 2 | DMT<br>1,3-butanediol<br>THIC | 45.8<br>29.0<br>25.2 | 450 | 8 | I | L (31%). |
| 3 | DMT<br>EG<br>THIC | 45.8<br>29.0<br>25.2 | 450 | 5½ | I | H (31%). |
| 4 | DMT<br>Neopentyl glycol<br>THIC | 45.8<br>29.0<br>25.2 | 440 | 4 | I | E (31%). |
| 5 | DMT<br>EG<br>THIC | 44.4<br>31.1<br>24.5 | 450 | 4 | I | G (30%). |
| 6 | DMT<br>EG<br>THIC | 47.7<br>30.2<br>22.1 | 450 | 5 | I | G (31%). |
| 7 | DMT<br>EG<br>THIC | 47.6<br>33.3<br>19.1 | 460 | 8 | I | I (31%). |
| 8 | DMT<br>EG<br>THIC | 45.8<br>29.0<br>25.2 | 450 | 4 | I | I (31%). |
| 9 | DMT<br>EG<br>THIC | 44.5<br>31.1<br>24.4 | 450 | 5 | I | J (31%). |
| 10 | DMT<br>EG<br>THIC | 44.5<br>31.1<br>24.4 | 455 | 4 | I | Q (31%). |
| 11 | DMT<br>EG<br>THIC | 44.5<br>31.1<br>24.4 | 450 | 4½ | I | H (31%). |
| 12 | DMT<br>EG<br>THIC | 44.5<br>31.1<br>24.4 | 400 | 10 | I | X (31%). |
| 13 | DMT<br>EG<br>THIC | 44.5<br>31.1<br>24.4 | 400 | 8 | I | J (33%). |
| 14 | DMT<br>EG<br>THIC | 44.3<br>28.0<br>27.7 | 440 | 5 | I | S (32%). |
| 15 | DMT<br>EG<br>THIC | 43.45<br>27.55<br>29.0 | 430 | 6 | I | Q (31%). |
| 16 | DMT<br>EG<br>THIC | 44.10<br>25.90<br>30.00 | 420 | 5 | I | S (31%). |
| 17 | DMT<br>EG<br>THIC | 44.3<br>28.0<br>27.7 | 420 | 4½ | I | O (29%). |
| 18 | DMT<br>EG<br>THIC | 44.3<br>28.0<br>27.7 | 420 | 4½ | I | M (32%). |
| 19 | DMT<br>EG<br>THIC | 44.3<br>28.0<br>27.7 | 430 | 7½ | I-A—Total fusion to viscosity X (37%CA). Add CA to 70% solids. Further esterifying to viscosity Z-6 (37% CA). | Z (34%). |
| 20 | DMT<br>EG<br>THIC | 43.4<br>27.6<br>29.0 | 420 | 8 | I-A—Total fusion to viscosity X (37% CA). Add CA to 70% solids. Further esterifying to viscosity Z-1 (37% CA). | I (32%). |
| 21 | DMT<br>EG<br>THIC | 43.4<br>27.6<br>29.0 | 420 | 8½ | I-A—Esterifying in presence of CA 70% solids to viscosity Z-4 (37% CA). | J (32%). |
| 22 | DMT<br>EG<br>THIC | 43.45<br>27.55<br>29.00 | 420 | 6 | I-A—Fusion to viscosity X (37%). Add CA (70%). Further esterifying to viscosity Z-4 (37% CA). | X (30%). |
| 23 | (1) DMT<br>(2) THIC<br>EG | 43.35<br>29.10<br>27.55 | 400 | 11 | II—Fusion (1) and (2) to viscosity T-U (37% CA). Add EG drop-wise at 400–410°. Further esterifying to viscosity Z-5 (37% CA). | O (31%). |
| 24 | DMT<br>EG<br>THIC | 42.0<br>25.6<br>32.4 | 420 | 4½ | I | T (32%). |
| 25 | DMT<br>EG<br>THIC | 43.6<br>27.6<br>28.8 | 420 | 9 | I-A—Total fusion to viscosity X-Y (37% CA). Add CA to 70% solids. Further esterifying to viscosity Z-3 (37% CA). | M (31%). |
| 26 | (1) DMT<br>(2) THIC<br>EG | 42.0<br>31.4<br>26.6 | 425 | 11 | Fusion (1) and (2) to viscosity U (37% CA). Add EG drop-wise esterifying to viscosity X-Y (37% CA). Add CA 70% solids and further esterifying to viscosity Z-3 (37% CA). | R (34%). |

TABLE I—Continued

| Ex. | Ingredients | Equivalent percent | Max. temp., °F. | Total reaction time, hours | Process | Gardner-Holdt final viscosity |
|---|---|---|---|---|---|---|
| 27 | (1) DMT<br>(2) THIC<br>EG | 43.0<br>29.75<br>27.25 | 420 | 12 | II-A—Fusion (1) and (2) to viscosity T (37% CA). Add EG drop-wise and esterifying viscosity X-Y (37% CA). Add CA to 70% solids and further esterifying to viscosity Z-3 (37% CA). | S (33%). |
| 28 | (1) DMT<br>(2) THIC<br>EG | 42.0<br>31.4<br>26.6 | 415 | 8½ | II-A—Fusion (1) and (2) to viscosity U-V (37% CA). Add EG drop-wise esterifying to viscosity X-Y (37% CA). Add CA to 70% solids and further esterifying to viscosity Z-3 (37% CA). | H (32%). |
| 29 | DMT<br>THIC | 40<br>60 | 420 | 6 | I-A—Fusion to viscosity X-Y (37% CA). Add CA to 70% solids. Further esterifying to viscosity Z-4 (37% CA). | M (32%). |
| 30 | (1) DMT<br>(2) THIC<br>1,3-butanediol | 43.6<br>28.8<br>27.6 | 450 | 10 | II—(1) and (2) Fusion to viscosity U (37% CA). Add EG dropwise, further esterifying to viscosity Z-2 (37% CA). | I (31%). |
| 31 | TICA (acid)<br>EG<br>Glycerin | 45.8<br>29.0<br>25.2 | 330 | 4 | I | T (30%). |
| 32 | TICME<br>EG<br>Glycerin | 45.8<br>29.0<br>25.2 | 380 | 5 | I | S (32%). |
| 33 | DMT<br>EG<br>Methylene-dianiline<br>THIC | 53.8<br>25.1<br>9.0<br>12.1 | 450 | 9 | I | S (32%). |
| 34 | DMT<br>EG<br>Phenylene-diamine<br>THIC | 53.8<br>25.1<br>9.0<br>12.1 | 460 | 9 | I | N (31%). |
| 35 | DMT<br>EG<br>$\left(\text{HOCH}_2\langle\phantom{o}\rangle\right)_2 O$<br>THIC | 53.8<br>18.0<br>16.1<br>12.1 | 430 | 10 | I | I (31%). |
| 36 | Terephthalic acid<br>THIC<br>EG | 43.3<br>29.3<br>27.4 | 490 | 10 | I | |
| 37 | DMT<br>EG<br>Glycerin<br>THIC | 43.1<br>27.2<br>14.3<br>15.4 | 430 | 9 | I | E (31%). |
| 38 | (1) DMT<br>(2) THIC<br>(3) EG<br>(4) Glycerin | 43.0<br>10.75<br>27.25<br>19.0 | 420 | 9 | II—(1) and (2) fused first; then (3) and (4) added. | E (32%). |
| 39 | (1) DMT<br>(2) DM Isophthalic<br>(3) THIC<br>(4) Glycerin<br>(5) EG | 9.0<br>34.0<br>10.75<br>19.0<br>27.25 | 430 | 8.5 | II—(1), (2) and (3) fused first; then (4) and (5) added. | D (32%). |
| 40 | (1) DMT<br>(2) THIC<br>(3) EG<br>(4) Mondur SH | 42.5<br>29.3<br>28.2<br>(²) | 430<br>³ 200-275 | 8<br>1 | II—(1) and (2) fused first; then (3) added; (4) added thereafter. | H (32%). |
| 41 | (1) DMT<br>(2) THIC<br>(3) EG<br>(4) Pentaerythitol | 43.5<br>14.5<br>27.5<br>14.5 | 420 | 9 | II—(1) and (2) fused first; then (3) and (4) added. | F (32%). |
| 42 | (1) Maleic anhydride<br>(2) THIC<br>(3) EG | 43.0<br>29.75<br>27.25 | 350 | 4 | II—(1) and (2) fused first; then (3) | H (30%). |
| 43 | (1) Dimethyl fumarate<br>(2) THIC<br>(3) EG | 43.0<br>29.75<br>27.25 | 380 | 5 | ____do____ | R (30%). |
| 44 | (1) Trimellitic anhydride<br>(2) THIC<br>(3) EG | 40.9<br>40.9<br>18.2 | 350 | 6 | ____do____ | X (32%). |
| 45 | (1) Adipic acid<br>(2) THIC<br>(3) EG | 43.0<br>29.75<br>27.25 | 450 | 9 | ____do____ | E (31%). |
| 46 | (1) Succinic anhydride<br>(2) THIC<br>(3) EG | 43.0<br>29.75<br>27.25 | 460 | 9 | ____do____ | D (31%). |
| 47 | (1) Dimeric acid<br>(2) THIC<br>(3) EG | 43.00<br>29.75<br>27.25 | 480 | 10 | ____do____ | B (35%). |
| 48 | (1) Diglycollic acid<br>(2) THIC<br>(3) EG | 43.0<br>29.75<br>27.25 | 400 | 5 | ____do____ | F (32%). |
| 49 | (1) DMT<br>(2) THIC<br>(3) Sorbitol | 40.0<br>40.0<br>20.0 | 420 | 14 | ____do____ | R (32%). |
| 50 | (1) DMT<br>(2) THIC<br>(3) Glycerol<br>(4) Diglycerol | 40.0<br>30.0<br>20.0<br>10.0 | 425 | 7 | II—(1) and (2) fused first; then (3) and (4) added. | E (31%). |
| 51 | (1) Citraconic acid<br>(2) THIC<br>(3) EG | 43.0<br>29.75<br>27.25 | 430 | 8 | II—(1) and (2) fused first; then (3) | E (32%). |

¹ 34% CA: Aromatic hydrocarbon (60:40).   ² 20% based on resin.   ³ After addition of (4).

When the polyester resins of the present invention are to be employed as magnet wire enamels, the resins are applied to the wires from solution by well-known methods. For optimum results we have found that solutions containing from about 25 to 40 percent resin solids should be employed. These solutions can be prepared by diluting higher concentration resin solutions with any of the resin solvents mentioned above.

The method of applying the resin to wire comprises passing the wire through the resin solution, through a suitable die, and then through an oven maintained at an elevated temperature to cure the resin on the wire. Where desired, the wire may be passed through the resin solution and a die a number of times and through the oven after each pass through the resin solution. This will provide a greater enamel build than is obtainable with only one pass through the resin solution. Although the die sizes are not critical, we prefer to employ dies which provide a clearance of from two to four mils around the wire. The speed at which the wire is passed through the resin solution and the temperature at which the oven is maintained depend on the particular resin solution employed, the build of enamel desired, the length of the oven in which the coated wire is cured, and the molecular weight of the resin used in the coating operation. We have found that an enamel build on a 40.3 mil or 18 wire round copper wire of about 3 mils (diameter of enameled wire less diameter of bare wire) may be obtained by passing the wire through a solution containing 25–35%, by weight, of a suitable polyester resin and through a heating tower 18 feet long at speeds of from about 15 to 40 feet per minute when the temperature of the curing oven is maintained at from about 800° F. to 1000° F. In general, the higher the wire speed, the higher is the optimum wire tower temperature. In the coating operation just described, the wire is generally passed through the resin solution and a wire tower six times to obtain the desired build. In addition, the wire can be coated by dip application, groove rolls, etc.

In order to insure complete curing of the polyester resins of the present invention when applying them to conductors, it is desirable to employ a curing catalyst to accelerate the curing reaction in the resin solutions during the coating operation, although satisfactory results are obtained without the use of such a catalyst. Among the many curing catalysts suitable for this purpose may be the soluble salts of Zn, Pb, Ti, Cd, Bo, Th, etc. for example zinc octoate, cadmium octoate, copper naphthenate, tetraisopropyl titanate, tetrabutyl titanate, etc., aromatic diisocyanates, aliphatic diisocyanates, etc. Where metal-containing curing catalysts are employed we have obtained satisfactory results using from about 0.05 to 3.0 or more percent, by weight, of the metal element of the catalyst based on the total resin solids. Preferably, we use sufficient metal containing catalyst to give about 0.1–2.0 percent metal based on the total resin solids and when using the diisocyanates we use about 20–25 percent, by weight, of the diisocyanate based on the total resin solids present. Where other cross-linking resins are employed such as melamine-aldehyde resins or modified derivatives thereof, one employs 1–10%, such as 1.5–8% but preferably 2–4% based on total solids.

Where the polyester resins of this invention are to be employed as slot insulation in dynamoelectric machines, it is necessary to form cured sheets or films of the resins. This can be accomplished by any of the conventional film forming methods such as casting a solution of resin and heating the casting to drive off the solvent and curing the resin. Films can also be formed by extruding viscous solutions of the resins into a heated chamber where curing takes place. Film formed from these resins are tough, flexible products having high dielectric strength, thermal stability and high tensile strength. These films may be used as slot insulation on dynamoelectric machines by lining the slots in armatures with the film and placing the insulated windings into the lined slots. These films can also be used as the dielectric material in capacitors and are particularly valuable for use in aluminum foil type capacitors.

It is seen that the polyester resins of the present invention are actually prepared in two steps. In the first step the reactants are cooked to a substantially linear polymeric form with the composition of the linear resin being essentially the same as the starting composition. This linear polymer is then further cured by the application of heat.

In order to determine whether the insulation on a magnet wire will withstand mechanical, chemical, electrical and thermal stresses encountered in winding machines and electrical apparatus, it is customary to apply the resin to a conductor and to subject the enameled wire to a series of tests which have been designed to measure the various properties of the enamel on the wire.

The wire enamels were prepared in a conventional manner. The resins prepared herein were diluted with a mixed solvent to a resin content of 25–35% by weight. The mixed solvent has a weight ratio of 6:3 to 6:4 cresylic acid to aromatic solvent. The aromatic solvent contained equal parts by weight of Solvesso 100 and Solvesso 150.

To the resin solutions were added the curing agents indicated in the table. The metal curing agents were added in the form of organic derivatives thereof, for example copper was added as copper naphthenate, zinc as zinc octoate, titanium as either tetraisopropyl titanate or n-tetrabutyl titanate. The concentrations of the metal employed are concentrations of the metal itself based on total weight of resin. For example in Example 1 the product was cured with each of 0.1% of Zn (as metal), 0.1% of Ti (as metal) and 0.02% of Cu (as metal), based on weight of resin, which were added to the resin solutions in the form of organic compounds thereof, i.e. zinc octoate, tetraisopropyl titanate and copper naphthenate. These solutions were applied in all examples to a 40.3 mil wire at a wire speed of 16 ft./min. and cured at a temperature of 1000° F.

Data on wire enamels prepared according to this invention are presented in the following Table II. In this table the columns have the following meanings:

Column 1.—The specific wire enamel example number of Table II.

Column 2.—The resin of Table I employed in preparing the wire enamel of Table II.

Column 3.—The specific curing agents employed in preparing the wire enamel, percents indicated as weight percents of the metal itself based on weight of resin.

Column 4.—Build in mils, i.e. the diameter of the enameled wire less the diameter of the bare wire.

Column 5.—The cut through temperature is the temperature at which the enamel film separating two magnet wires crossed at 90° and supporting a given load (1000 g.) on the upper wire flows sufficiently to establish electrical contact between the two conductors. This test is described in MIL–W–583B.

Column 6.—Percent Elongation Test measures the flexibility of the enamel on a magnet wire and is determined by stretching the enameled conductor and examining the stretched portion of the wire under a binocular microscope at 10× to determine imperfections on the surface of the enamel, such as (1) parallel surfaces lines or fissures (i.e. crazing) (2) breaks in which two sections of the wire are physically separated, i.e. a crack (3) mar or blemish. The wire is stretched to the failure point which is recorded as percent elongation.

Column 7.—The 25% Elongation+1X-Flexibility Test is carried out on an insulated electrical conductor having a diameter X which is elongated 25% and wound about a mandrel having a diameter of 1X. If this does not show the blemishes noted in column 7 (Percent Elongation Test) it passes the test.

Column 8.—In the Scott Twist Test a wire 10 in. long is twisted clockwise on its axis until a break occurs and the number of twists required are recorded.

Column 9.—In the Electric Strength Twisted Pair Test a sample made up of two pieces of enameled wire each 9 in. long which has been twisted together 18 times is held under 3 pound tension. A potential is then placed across the two conductors and voltage is increased at the rate of 250 v./second until a finite current flows through the insulation. The voltage determined is referred to as "dielectric strength (or voltage per mil), twisted pair." The specific figure recorded in Table II is the voltage applied to the specific wire which can be converted to voltage/mil by dividing by the build of enamel.

*Column 10.*—This is the Emerson Scrape Test developed by the Emerson Electric Company, Test Procedure W 12, Single Scrape. It is described as follows:

(1) Pull a continuous length of enameled wire between a .050" diameter hardened steel needle and a flat smooth steel block. The wire should travel at right angles to the needle. The rate of travel of the wire should be approximately 12" per second.

(2) Apply a fixed force to the .050" needle and then by means of a cam, gently lower the needle onto the traveling wire. The force should be at right angles to both the needle and the wire.

(3) Let the needle with the entire applied force rest on the traveling enameled wire for ½ to ¾ second and then by means of the same cam, remove the needle from the wire.

(4) After ¼ to ½ second repeat steps 2 and 3.

(5) After sufficient trials, readjust force and repeat steps 2 through 4.

(6) Determine the minimum force required to expose bare copper 8 out of 10 times that the needle is lowered on the wire. This force shall be called the maximum value.

NOTE.—A 6-volt light or buzzer circuit can be used to detect bare copper but the .050" needle should not be used as the detector. A soft bristle brush or mercury bath should be satisfactory.

*Column 11.*—Chloroform Resistance Test—this test determines the chloroform solvent resistance of the wire enamel. After 4 minutes at room temperature in chloroform, the wire is examined for blisters, swelling or softening. Any visible change constitutes a failure.

*Column 12.*—50:50 Solvent Resistance Test—the test determines the effects of when the enameled wire is placed in 50:50 (equal volumes) of boiling U.S.P. ethanol and toluene for 30 minutes. The wire is examined for defects as in Column 12.

The polyesters of this invention shown in Table I were cured to an average build of about 3 mils in the conventional manner employing a wire speed of 16 ft./min. and a curing temperature of 1000° F. The following curing agents were employed: No curing agent, zinc (0.1–1%), titanium (0.1–1%), boron (0.1–1%), copper (0.01–0.1%), $BF_3$ (0.1–0.3%), isocyanate (10–20%), melamine-formaldehyde resin (2–5%), zirconium (0.1–0.1%), phosphoric acid (0.5–1%), etc. including mixtures of the above curing agents. Employing these curing agents we have produced wire enamels possessing some of the following properties:

Abrasion resistance _____ 100+.
Military cut through
 temperature, °F. _____ 650+.
Percent elongation _____ 38+.
25% elongation+1X _____ Pass.
Scott twist _____ 195+.
Emerson Scrape Test _____ 31.
Dielectric strength
 (twisted pair) _____ 13,000+(3.3 mil build).
Chloroform resistance _____ Pass.
50-50, 30 min. solvent boil _. Pass.

In certain wire enamels it is desirable to enhance one property of the wire at the expense of another property. For example, we have found that the Emerson Scrape Test is the best for appraising the windability of a wire. However, in certain instances curing agents which tend to enhance the Emerson Scrape Value may tend to lower the abrasion resistance of the wire enamel. Since the Emerson Scrape Test is the best test for windability, we rely on this test, rather than on abrasion resistance, to evaluate our wire enamels.

The following specific examples are presented to illustrate our invention.

TABLE II.—WIRE ENAMELS

| Ex. | Table I, Polyester Ex. | Curing agent, weight percent based on resin | Build in mils | Mil cut through, °F. | Percent elongation | Percent elongation+1X | Scott twist | Dielectric strength, twisted pair | Emerson scrape | Chloroform resistance | 50-50, 30 min. solvent boil |
|---|---|---|---|---|---|---|---|---|---|---|---|
| 1 | 9 | Zn (0.1), Ti (0.6), Cu (.02) | 3–3.1 | 450 | 25 | OK | 175 | 11,666 | 24 | OK | OK. |
| 2 | 5 | Zn (0.1), Ti (0.6), Cu (.02) | 3.1 | 560 | 30 | OK | 155 | 11,666 | 24 | OK | OK. |
| 3 | 17 | Zn (0.1), Cu (0.01), Ti (0.5) | 3–3.3 | 580 | 31 | OK | 148 | 9,666 | 26 | OK | OK. |
| 4 | 21 | Ti (0.1) | 3.1–3.2 | 600 | 34 | OK | 139 | 11,200 | 23 | OK | OK. |
| 5 | 23 | Melamine (2) | 3–3.1 | 650+ | 34 | OK | 143 | 10,500 | 30 | OK | OK. |
| 6 | 23 | Melamine (2), Zn (0.1) | 2.9–3.0 | 650+ | 34 | OK | 142 | 11,200 | 30 | OK | OK. |
| 7 | 23 | Melamine (4) | 3.0 | 640 | 34 | OK | 140 | 10,300 | 28 | OK | OK. |
| 8 | 23 | Melamine (4), Zn (0.1) | 3.0 | 650+ | 31 | OK | 145 | 9,600 | 30 | OK | OK. |
| 9 | 23 | Melamine (3) | 3.0–3.1 | 650+ | 36 | OK | 141 | 9,600 | 31 | OK | OK. |
| 10 | 23 | Melamine (2), Cu (0.01) | 2.9–3.0 | 650+ | 35 | OK | 144 | 10,600 | 31 | OK | OK. |
| 11 | 23 | Melamine (2), Cu (0.04) | 3.0–3.1 | 650+ | 34 | OK | 148 | 9,000 | 28 | OK | OK. |
| 12 | 23 | Melamine (2), Cu (0.06) | 2.8–3.0 | 650+ | 33 | OK | 143 | 9,500 | 31 | OK | OK. |
| 13 | 23 | Ex. 12, Table II, overcoated with Mylar. | | 650+ | 33 | OK | 146 | 9,000 | 30 | OK | OK. |
| 14 | 23 | Melamine (2), Cu (0.02), overcoated with Mylar. | 2.9–3.0 | 650+ | 35 | OK | 143 | 10,000 | 30 | OK | OK. |

Melamine of table is a melamine-formaldehyde resin of the film type.

The resins of the present invention possess excellent mechanical, chemical, thermal and electrical properties. The desirable properties will depend on the particular application to which they are applied. Where the resins are employed as wire enamels, the desired properties will depend on the conditions under which the wire enamels are employed. In general, we prefer that the wire enamels of this invention possess the following properties:

(1) *MIL cut through temperature.*—The power output of motors and generators can be increased by increasing the current density in the magnet wires of these machines. However, as the current density is increased, the operating temperature of the magnet wires is also increased. In order to determine whether a magnet wire may be employed at high temperatures, it is necessary to measure the properties of the enameled conductor at high temperatures. One measure of this is the cut through temperature of the enamel. In general we prefer the wire enamel to have a cut through temperature of at least 350° F., such as at least 500° F. but preferably at least 600° F.

(2) *Percent elongation.*—In order to determine another mechanical property of the enamel its flexibility, the percent elongation of the enamel is determined. This property is a very important attribute of the enamel when subjected to the stresses of automatic winding. In general, we prefer a percent elongation of at least 25%, such as 28%, but preferably above 30%.

(3) A more severe test for flexibility is the 25% elongation+1X. A satisfactory wire enamel should pass this test.

(4) The Scott Twist Test is employed to determine the mechanical properties of the enamel and is reported as the number of twists before defects appear on the enamel. In general a satisfactory wire enamel should have a Scott Twist rating of at least about 130 such as at least about 140, but preferably at least about 150.

(5) The Dielectric Twisted Pair Test is a measure of the dielectric strength of the wire enamel. In general a satisfactory wire enamel having a build of about 3 mils should have a value of at least about 7500 v., such as at least about 9500 v., but preferably at least about 10,000 v.

(6) The Emerson Scrape Test is particularly important in determining the probability of a break occurring in the wire under high speed winding. In general where the Emerson Scrape value for the bare wire itself is determined and the value for the wire enamel approaches this value, conditions of winding which would not break the wire will not affect the wire enamel itself. Thus, where the wire itself has an Emerson Scrape value of about 30–31, we prefer that the wire enamel have a value of at least about 20, such as at least about 25, but preferably about the same value that the wire itself possesses, i.e. at least about 30.

One convenient method of upgrading the Emerson Scrape properties of a polyester of this invention is to employ a triazine curing agent in preparing the wire enamel, for example, a melamine-aldehyde resin, or a modified melamine-aldehyde resin such as a melamine-formaldehyde resin modified with an alcohol or its equivalent such as an alkanol, e.g., methanol, ethanol, propanol, butanol, etc. We have prepared wire enamels having Emerson Scrape values equal to the wire itself, for example a value of at least 30 by employing at least about 2%, by weight, of a melamine-formaldehyde resin (or a melamine-formaldehyde resin modified with an alcohol such as a lower alkanol) based on polyester resin such as about 1 to 10%, but preferably 2 to 5%, with or without other curing agents such as metal catalysts. By employing melamine-formaldehyde resins or modified derivatives thereof we have prepared wire enamels having an Emerson Scrape value equal to the wire itself.

We have compared Abrasion Resistance properties with Emerson Scrape properties of our enamels and have found that there is little, if any, correlation between these properties. For example, a wire may have an abrasion resistance of 30 and an Emerson Scrape rating of 31. We have further found a high Emerson Scrape rating to be a better indication of the windability of an enameled wire. Thus, if the copper wire itself has an Emerson Scrape rating of 31, and the enamel also had the same rating (31), the wire would have a high windability rating even though its abrasion resistance was only 30.

It has been noted above that the viscosities of the polyester resins of this invention containing isocyanuric derivatives can be increased by heating in the presence of cresylic acid. For example, where a resin is prepared by total fusion according to Process I and then heated in the presence of cresylic acid according to Process I–A, the resins prepared according to Process I–A have higher viscosities than those prepared according to Process I. These higher viscosity resins of Process I–A are more satisfactory when employed in a wire coating process where greater adhesion is advantageous such as in dip applications, groove rolls, etc. Similarly resins prepared by the two step Process II and further modified according to Process II–A have higher viscosities, and are more suitably employed in dip applications, groove rolls, etc.

Wires insulated with the polyester wire enamels containing isocyanuric derivatives of this invention can be further improved by applying over the enamel layer an overcoat of a highly linear thermoplastic polymer. In general, this overcoat has the following characteristics:

(1) A melting point above 175° C.
(2) A relative viscosity above 1.3.
(3) A tensile strength at 175° C. of at least 30,000 lbs./sq. in.
(4) Super polymer characteristics, whereby the polymer is capable of forming a fiber and of being cold drawn.
(5) A thermal life of at least 4,000 hrs. at 200° C. when coated on a #18 Heavy film wire to give a 0.003 in. increase in diameter, using AIEE Twist Procedure No. 57 with 1,000 volts as a failure criterion.

The thickness of the outer layer of the linear polymer normally is preferably at least 10% of the thickness of the inner enamel layer but substantially thinner than the inner layer. Such an outer layer improves physical properties, particularly improving heat shock.

For the thermoplastic linear polymer of the outer layer, a polyester resin obtained by reacting a dihydric alcohol with an aromatic dicarboxylic acid is particularly suitable. Preferably, the linear polymer is a glycol-terephthalate polyester of predominantly high molecular weight, such as polyethylene terephthalate known in the trade as "Dacron" or "Mylar." Examples of other such linear polyesters well adapted for this use are polycyclohexylene dimethyleneterephthalate known in the trade as "Kodel" of the fiber-forming type, a polyethylene terephthalate known as "Celanese Polyester Fortrel" (a product of Fiber Industries, Inc), and a polyethylene terephthalate-isoterephthalate product of Goodyear known as "Vicron." Also suitable for this purpose is a polyaromatic polycarboxylic aromatic imide known as DuPont's "M–L" which has good thermal life and, like the terephthalic base materials, can eliminate heat and solvent shock and meet the other requirements of a high temperature Class F (155° C.) magnet wire. Other equivalent materials can be employed.

The linear thermoplastic polymer of the outer insulating layer of a wire made according to the invention acts as a rubber-like band of high tensile strength which, when the conductor is bent or stretched and heated, prevents heat shock in the underlying layer of enamel. Further, the greater toughness and insolubility of this outer layer greatly enhance the physical and chemical properties of the finished wire. Since highly linear polymers such as dihydric alcohol-terephthalate polyesters have excellent heat resistance, they do not detract from the overall thermal properties of the finished wire, still permitting operation at 155° C. (Class F or above).

The following examples are presented for purposes of illustration and not of limitation.

*Example A*

Pour 875 parts of o-creosol and p-chlorophenol (weight ratio 4:1) into a stainless steel container, heat it to 80–90° C., and add with gentle stirring 125 parts of Dacron No. 54 (DuPont) in small portions. Under these conditions, the polyester will readily dissolve in the liquid. Then add 10 parts of xylene with stirring, close the container, and apply vacuum to remove xylene together with any water that may be in the cresylic acid or adhering to the polyester. Check the quantity removed by measuring the condensate or by loss of weight of the batch and make certain that all of the xylene has been withdrawn. Then discontinue the vacuum, heat the mixture to 110–120° C. in a closed container with gentle stirring, maintain this temperature for 30 minutes, cool to below 60° C., and filter. The solution, now ready for coating, has a viscosity of 195–200 cps., and a solids content of 12.5%, and weighs 8.90 lbs./gal. The coating and heating procedures are conventional and similar to those used for the wire enamel undercoat.

Example B

The procedure noted in Example A above is followed except for the substitution of "Mylar" or "Terylene" for the "Dacron."

Example C

The procedure noted in Example A above is followed except for the substitution of "Kodel" of the fiber-forming type for the "Dacron."

The outer layer of thermoplastic linear polymer should preferably be at least about 10% of the thickness of the inner layer of thermosetting non-linear polyester or modified polyester. This is particularly so for round wire "Triple," sizes 8 through 40. For square and rectangular wire as well as round wire, "Single" and round wire "Heavy," the outer layer should constitute at least 13% of the total thickness or "build" of the combined inner and outer layers. On the other hand, the outer layer should be substantially thinner than the inner layer and preferably not greater than 25% of the inner layer thickness. Normally, the desired ratio of the two layer thicknesses can be obtained by applying from three to seven coats of the inner layer material and one or at most two coats of the outer layer material, each coat being applied by a wiping die and oven-cured in the conventional manner before application of the next coat.

The outer layer, in its preferred form, may be described as a thermoplastic linear polyester having a melting point of at least 175° C. and a relative viscosity above 1.3 and consisting essentially of the product of reaction of an aromatic dibasic compound selected from the group consisting of terephthalic acid, isophthalic acid, acyl chlorides of these acids, lower alkyl esters of these acids, and mixtures thereof, with a lower aliphatic diol containing from 2 to 10 carbon atoms in the molecule. More preferably, the polyester is essentially the reaction product of a terephthalic dibasic compound and a straight chain diol having from 2 to 5 carbon atoms in the molecule and two primary hydroxyl groups. Determination of the relative viscosity (i.e., the ratio of the efflux time of a solution of the polymer to the efflux time of the pure solvent) can be made conveniently by placing the polyester in a solution containing one gram of the polyester per deciliter of solvent which is a 60/40 mixture of phenol and tetrachloroethane, and using viscosity measurements made at 77° F. in a size 200 Ostward-Kannon-Fenske viscometer.

A further example of the coating solution for the outer layer is as follows:

Example D

Mix 13 parts by weight of a cold-drawable ethylene glycol dimethyl terephthalate homopolyester, having a relative viscosity of 1.63 and a melting point in the range of 257–265° C., with 87 parts of a solvent system consisting (by weight) of 45% phenol, 25% o-cresol and 30% of a 50/50 mixture of meta and para-cresol containing 1% of xylenols, principally 2,4-xylenol. Heat this mixture to 240–250° F. and hold it at that temperature for 30 minutes with mild agitation to provide a solution. On cooling to room temperature, the solution has an initial viscosity of 80 seconds #4 Ford Cup at 86° F. The wire coating and heating procedures are conventional.

In addition to employing the highly linear thermoplastic polymer as an overcoat for the wire enamel, the linear thermoplastic polymer can also be blended into the polyesters containing the isocyanuric derivatives of this invention, and this blend may be cured as a wire enamel in the conventional manner. The amount of linear thermoplastic polymer employed may vary depending on the particular formulation and as well as its solubility in the particular resin. In general, the linear polymer is blended into the uncured wire enamel by employing a mutual solvent for both wire enamel and linear polymer. It is preferable that the solution prepared in this manner be employed in wire applications. In the preferred embodiment cresylic acid is employed as a mutual solvent. The amount of linear polymer in the uncured wire enamel may be about 1 to 40% or more, by weight, of linear polymer based on weight of uncured wire enamel, such as from about 5 to 30%, but preferably about 10 to 20%. The linear polymer can be added as such to a cresylic acid solution of uncured wire enamel or a cresylic acid solution of the linear polymer can be added to uncured wire enamel. The following is a non-limiting example of a method of blending the linear polymer into the uncured wire enamel.

Example E

The polyester of Example 23 dissolved in cresylic acid to a 30% solution was heated to a temperature of 250° F. and sufficient Mylar was added thereto to form a blend containing 15% of Mylar based on weight of polyester resin.

This product was applied to a wire in the conventional manner and cured. (16 ft./min. at 1000° F.)

Example F

The above example was repeated employing (1) Dacron
(2) Kodel
(3) Fortrel
(4) Ficron
(5) M–L polymer in place of Mylar.

In the case of M–L polymer, dimethylacetamide was added to solubilize M–L polymer. Wire enamels prepared in this manner possess excellent properties.

Example G

The example illustrates the preparation of films from the polyester resins of the present invention. A polyester resin was prepared according to Example 23. This resin was allowed to cool to a brittle solid and a portion of this solid was heated with an equal weight of cresylic acid at 212° F. until a homogeneous solution was formed. After cooling, portions of this solution were spread on tin plates and the coated plates were heated at 350° F. for 70 minutes and at 490° F. for 30 minutes. This resulted in a number of cured, transparent polyester resin films. These films were removed from the tin plates by placing a drop of mercury at the edge of the film to amalgamate the surface of the tin film and then peeling the film from the resulting amalgam. Tensile tests of several of these films have a thickness of from about 1.5 to 6 mils showed high tensile strengths.

Although the utility of the polyester resins of our invention has been described principally in terms of electrical applications, it should be understood that these resins may be used in all of the other applications suitable for synthetic resins. Thus, these resins can be employed in protective coating applications by applying the resin in a suitable solvent to a surface by brushing or spraying with subsequent curing. When used as a protective coating, these resins have outstanding resistance to weathering and do not discolor after extended exposure to elevated temperatures. These resins can also be employed in varnish and paint formulations. These resins can also be used in molding powder formulations by mixing them with various fillers such as wood flour, diatomaceous earth, carbon, silica, etc. These resins are also useful as impregnants and as bonding materials for metallic and fibrous laminates.

Having thus described our invention what we claim as new and desire to obtain by Letters Patent is

1. A melamine-aldehyde resin modified polyester reaction product derived from (I) a polyfunctional derivative of an isocyanuric acid selected from the group consisting of (1)

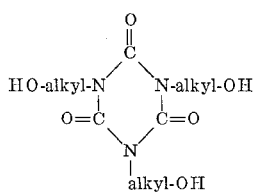

and (2)

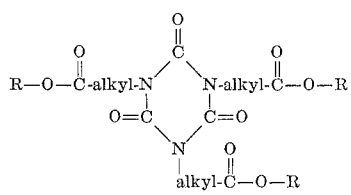

where R is hydrogen or the hydrocarbon-containing moiety of an alcohol, (II) a member of the group consisting of (1) polycarboxylic acids and esters thereof, (2) glycols, (3) polyols and (4) mixtures thereof, and (III) a melamine-aldehyde resin.

2. The melamine-aldehyde resin modified polyester reaction product of claim 1 wherein the polyfunctional derivative of an isocyanuric acid is

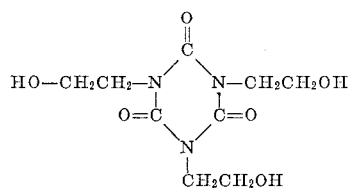

3. The melamine-aldehyde resin modified polyester reaction product of claim 1 wherein the polyfunctional derivative of an isocyanuric acid is

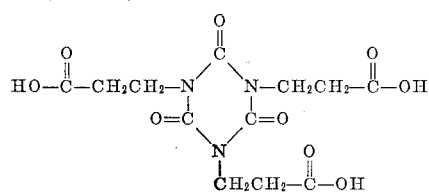

and esters thereof.

4. A melamine-aldehyde resin modified polyester reaction product derived from (I)

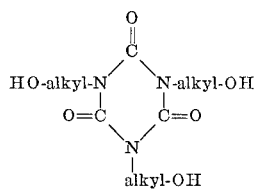

(II) a polycarboxylic acid and a glycol, and
(III) a melamine-aldehyde resin.

5. The melamine-aldehyde resin modified polyester reaction product of claim 4 wherein the polycarboxylic acid and the tris(hydroxyalkyl) isocyanurate are esterified prior to the addition of the glycol.

6. The melamine-aldehyde resin modified polyester reaction product of claim 5 prepared in the presence of cresylic acid.

7. The melamine-aldehyde resin modified polyester reaction product of claim 4 wherein the polycarboxylic acid is a phthalic acid and the glycol is ethylene glycol.

8. The melamine-aldehyde resin modified polyester reaction product of claim 7 wherein the phthalic acid is a member of the group consisting of isophthalic acid and terephthalic acid and the tris(hydroxyalkyl) isocyanurate is tris(hydroxyethyl)isocyanurate.

9. The melamine-aldehyde resin modified polyester reaction product of claim 8 wherein the phthalic acid and tris(hydroxyethyl) isocyanurate are esterified prior to the addition of ethylene glycol.

10. The melamine-aldehyde resin modified polyester reaction product of claim 9 prepared in the presence of cresylic acid.

11. An insulated electrical conductor comprising in combination, an electrical conductor coated with the cured polyester reaction product of claim 1.

12. An insulated electrical conductor comprising in combination, an electrical conductor coated with the cured polyester reaction product of claim 1 overcoated with a linear polymer.

13. An insulated electrical conductor comprising in combination, an electrical conductor coated with the cured polyester reaction product of claim 2.

14. An insulated electrical conductor comprising in combination, an electrical conductor coated with the cured polyester reaction product of claim 3.

15. An insulated electrical conductor comprising in combination an electrical conductor coated with the cured polyester reaction product of claim 4.

16. An insulated electrical conductor comprising in combination, an electrical conductor coated with the cured polyester reaction product of claim 4 overcoated with a linear polymer.

17. An insulated electrical conductor comprising in combination, an electrical conductor coated with the cured polyester reaction product of claim 5.

18. An insulated electrical conductor comprising in combination, an electrical conductor coated with the cured polyester reaction product of claim 6.

19. An insulated electrical conductor comprising in combination, an electrical conductor coated with the cured polyester reaction product of claim 7.

20. An insulated electrical conductor comprising in combination, an electrical conductor coated with the cured polyester reaction product of claim 8.

21. An insulated electrical conductor comprising in combination, an electrical conductor coated with the cured polyester reaction product of claim 9.

22. An insulated electrical conductor comprising in combination, an electrical conductor coated with the cured polyester reaction product of claim 10.

References Cited by the Examiner
UNITED STATES PATENTS

| | | | |
|---|---|---|---|
| 3,133,032 | 5/1964 | Jen et al. | 260—22 |
| 3,174,950 | 3/1965 | Cordier | 260—248 |
| 3,211,585 | 10/1965 | Meyer et al. | 260—248 |
| 3,215,758 | 11/1965 | Hopkins | 260—248 |

LEON J. BERCOVITZ, *Primary Examiner.*

R. W. GRIFFIN, *Assistant Examiner.*